May 21, 1935.  H. C. EDDY  2,001,776

METHOD AND APPARATUS FOR ELECTRICALLY TREATING EMULSIONS

Filed April 18, 1932

INVENTOR:
Harold C. Eddy,
BY
ATTORNEY.

UNITED STATES PATENT OFFICE 2,001,776

METHOD AND APPARATUS FOR ELECTRICALLY TREATING EMULSIONS

Harold C. Eddy, Los Angeles, Calif., assignor to Petroleum Rectifying Company of California, Los Angeles, Calif., a corporation of California Application April 18, 1932, Serial No. 605,910

11 Claims. (Cl. 204—24)

This invention relates to a method and apparatus for dehydrating petroleum emulsions, and is a continuation in part of my application Serial No. 157,530, filed December 28, 1926.

When such an emulsion is allowed to stand it becomes much harder to treat than when fresh. This is particularly true if the emulsion remains in a sump, earthern reservoir, or other open storage, one factor being that the sun's rays evaporate certain of the lighter constituents and release any dissolved gases which might be present, and cause the petroleum emulsion to oxidize. Further, the salts in solution in the water phase of such an emulsion concentrate at the interface of the emulsion particles. The emulsion, therefore, becomes "dead", the viscosity is increased, the surface tension becomes greater, and the interfacial tension between the emulsion particles and the external oil phase increases. An emulsion of this nature often contains colloidal material and concentrated brines, and therefore has a low resistivity and is very difficult, if not impossible, to treat with the ordinary form of electric dehydrating apparatus at present in use.

I have found that such an emulsion may be successfully separated into its constituents if first subjected to a preliminary treatment which so conditions this oxidized emulsion that treatment with an electric field is made possible, and it is an object of the present invention to provide such a system and method. This preliminary treatment increases the resistivity of the mass and modifies the interfacial tension of the emulsion particle. In addition, the viscosity of the mass and surface tension of the emulsion are materially reduced.

In my invention I accomplish this reduction in viscosity and surface tension, together with the increase in resistivity and modification of the interfacial tension, by agitating the emulsion with a gas under sufficient pressure to cause this gas to enter the emulsion and to become diffused therein. This gas may be either wholly or partially inert, and is preferably substantially non-condensable so that it retains its gaseous form even when dispersed in the emulsion. Under sufficient pressure such a gas will in the main be absorbed by the external phase of the emulsion but a portion of this gas will be adsorbed at the interface of the emulsion particles. If the emulsion is subjected to the action of an electric field while under sufficient pressure to retain this gas therein, it will be found that successful electric treatment can be effected.

It is an important object of this invention to treat a petroleum emulsion by entraining in this emulsion gas particles, and subjecting this emulsion to the action of an electric field during the time that these gas particles are entrained therein.

It is a further object of the invention to provide a method and apparatus for treating an oxidized petroleum emulsion by causing this emulsion to absorb and adsorb a gas, after which the emulsion is subjected to the action of an electric field while being maintained under sufficient pressure to retain the gas in the emulsion.

It will be understood that pressure operation is quite essential in my process, for it is only by the use of high pressures that the gas can be forced into the liquid. In this connection, it is usually necessary to operate the electric dehydrator at a much higher pressure than ordinarily utilized The usual working pressure for an electric dehydrator ranges from atmospheric pressure to 25 lbs. per square inch. In exceptional instances the pressure has been raised to 50 lbs. per square inch, but never materially more. In the present process the amount of gas which can be forced into the emulsion is a direct function of the pressure, and the best operation can only be obtained when pressures considerably higher than those at present in use are utilized. With some emulsions a desirable effect can be secured at a pressure of 75 lbs. per square inch. Usually, however, pressures of 150 lbs. per square inch are desirable, and the effectiveness of the treatment is increased by further increases in pressure. There appears to be no upper limit, the effectiveness of treatment of certain emulsions increasing in direct proportion to the pressure. It can be said, then, that the pressure may be extremely high, being limited only by the strength of the apparatus.

It is an important object of the present invention to provide a dehydrating system in which high pressures are utilized in conjunction with a device for introducing gas into an emulsion.

The present process should be distinguished from certain prior processes which in effect reduce the viscosity by dilution. In this connection, still vapors from distillates have been used to dilute emulsions, but such vapors quickly condense into a liquid state when introduced under pressure into the incoming emulsion and thus serve only to dilute the emulsion. In the present process a liquid and a gas which are immiscible at atmospheric pressure are intimately intermixed, the gas being entrained in the emulsion by being absorbed and adsorbed therein. Thus, in the present process the action is one of absorption and adsorption rather than one of dilution.

It is true that if the gas utilized is "wet", carrying therewith minute particles of liquid, these liquid particles dissolve in the oil phase. The use of such a "wet" gas is, however, in no sense essential to the effectiveness of the present process. A "dry" gas may very well be utilized. For instance, a dry natural gas containing in the main methane and ethane serves very satisfactorily, though such a gas sometimes requires a somewhat higher pressure than would a "wet" natural gas which included minute amounts of the higher hydrocarbons. Natural gas is ordinarily the most satisfactory gas from an economic standpoint, due to its availability and effective action. Other gases may, however, be utilized and fall within the scope of this invention. For instance, at a given pressure it is possible to cause an emulsion to absorb and adsorb carbon dioxide in a much greater degree than natural gas. So also, air can be utilized in this capacity, though the amount of air which can be entrained in emulsion at a given pressure is less than the amount of natural gas. Similar remarks apply to hydrogen. In many instances it is possible in commercial operation to use a dry waste gas from an absorption plant which has been stripped of the higher hydrocarbons and consists chiefly of methane and ethane. In other instances a combustion gas mixture of carbon dioxide and nitrogen, or a producer gas, may be utilized to advantage. Ordinarily the gas should have a higher dielectric strength than the emulsion, though this is not in all instances necessary. In all cases, however, it is desirable to use a gas which is non-condensable under ordinary conditions, or a gaseous mixture containing a large percentage of non-condensable gas. Such a gas or gaseous mixture is hereinafter referred to as a substantially non-condensable gas. Vapors cannot be successfully utilized under ordinary conditions due to the fact that they condense upon being introduced into the emulsion and thus provide no gas which can be entrained in the emulsion.

It is thus a further object of the invention to entrain in an emulsion prior to electric treatment a substantially non-condensable gas.

It is another object of the invention to remove any un-entrained or free gas from the emulsion prior to electric treatment. This step is in itself novel regardless of whether or not gas is forced into the emulsion for I have found it desirable to always remove free gas from the emulsion prior to electric treatment, thus preventing accumulation of an explosive mixture in the treater.

Still further objects of the invention lie in the apparatus hereinafter described, while other objects and advantages of the invention will be made evident hereinafter.

Referring to the drawing—

Figure 1:
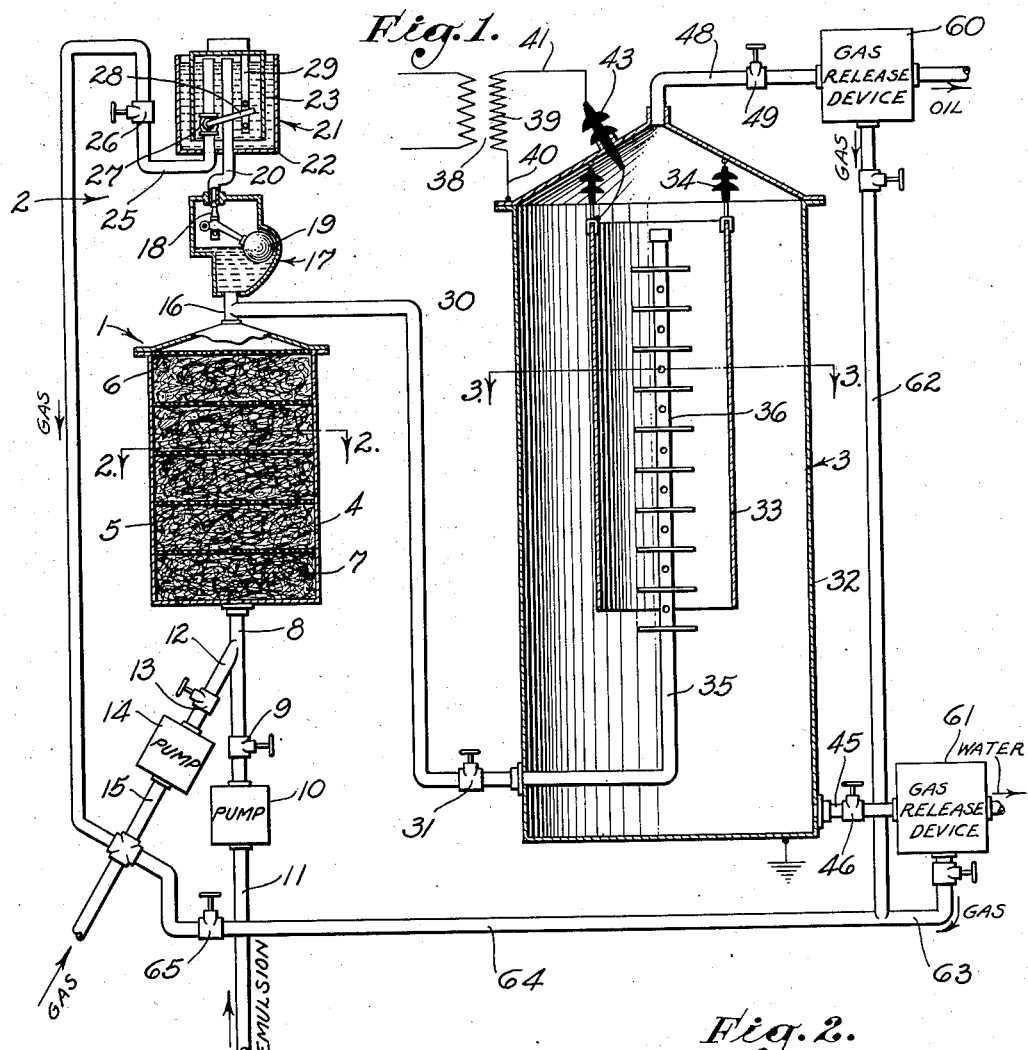
Fig. 1 is a diagrammatic sectional view of one form of apparatus suitable for carrying out the process.
Figures 2, 3:
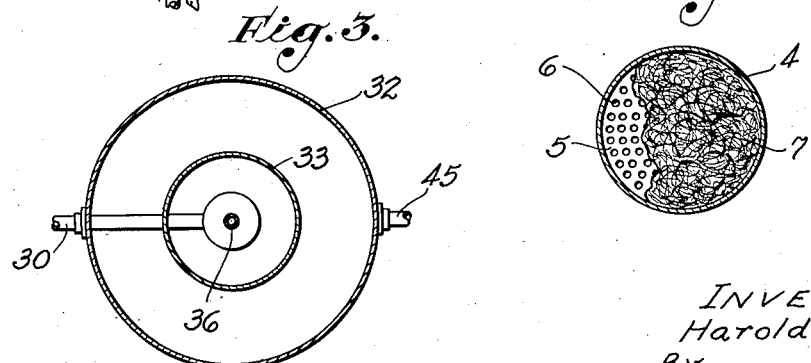
Figs. 2 and 3 are sectional views taken on corresponding lines of Fig. 1.

Referring to the drawing in detail, the invention ordinarily includes an absorption device 1, a gas-release means indicated generally by the numeral 2, and a dehydrator 3.

The absorption device 1 may conveniently comprise a shell 4 in which a series of plates 5 are placed, these plates having perforations 6. Positioned between the plates 5 are sections of filter or contacting material 7 of a porous nature designed to give a mixing action and cause the gas to come into intimate contact with the fluid or oil. Such a filter material may, for instance, be a mass of broken glass, iron filings or shavings, or metal lath. Other types of mixing devices may, however, be used, the main requirement being to bring the gas and emulsion into such intimate contact that the gas is entrained in the emulsion.

Connected to the lower end of the shell 4 is an emulsion-supply pipe 8 having a valve 9. This pipe 8 communicates with a pump 10 which draws emulsion through a pipe 11. The gas is preferably, though not necessarily, injected into the emulsion prior to the time that the emulsion enters the shell 4. In the preferred form of the invention this gas is introduced into the pipe 8 through a pipe 12 which has a valve 13 and which communicates with a pump 14 having an intake pipe 15 through which gas is supplied.

The sections of filter material 7 act to entrain the gas in the emulsion so that the mixture flowing from the upper end of the shell and through an emulsion pipe 16 comprises an emulsion in which the gas is absorbed and adsorbed.

The pipe 16 extends upward to a trap 17 which also serves as a pressure-reducing means. In some instances a conventional valve may be used in this capacity, but in the preferred embodiment a float-operated gas-eliminating valve or trap is utilized. As shown this trap includes a chamber 20 in which any free or un-entrained gas may separate from the emulsion. The lower end of this chamber contains a body of the emulsion, and the gas is released from the upper end of the chamber through a valve 18 controlled by a float 19 operatively connected thereto in a well-known manner so that an excess amount of gas accumulating in the upper end of the chamber will lower the level of the emulsion, and thus automatically open the valve 18 to allow escape of the gas. The pressure in this chamber is substantially the same as the pressure in the pipe 16, but the valve 18 acts as a throttle to reduce the pressure of the gas flowing from the chamber into a pipe 20 which extends upward into a gas-collecting device 21 which may form a part of the gas-release means 2.

Diagrammatically, I have shown this gas-collecting device as comprising a tank 22 which is filled with a sealing fluid. A cover 23 is in the form of an inverted cup and is movable within the tank 22. The pipe 20 terminates inside the cover 23 so that when gas passes through the pipe 20 this gas moves into the interior of the cover 23 causing it to move upward as the gas collects therein. A gas take-off pipe 25 extends upward into the interior of the cover 23 and is provided with a main valve 26 and a control valve 27. The latter valve has a valve arm 28 which is operated by means of an arm 29 attached to the cover 23. As the cover 23 moves upward a certain distance the valve arm 28 is moved upward so that the control valve 27 is opened. The gas which is collected in the cover 23 then escapes through the pipe 25 and the cover 23 returns to a lower position depressing the valve arm 28 until the valve 27 is closed. This valve then remains closed until the gas again fills the cover 23. This type of gas-collecting device is well-known in the art and is only diagrammatically shown in Fig. 1. Other types of gas-release means than the trap 17 and the gas-collecting device 21 may be utilized.

The gas thus collected in the gas-collecting device 21 can very profitably be re-cycled into the incoming emulsion if desired. Thus, the pipe 25 in the preferred embodiment returns the gas to the intake pipe 15 of the pump 14. In this connection, it will be understood that the gas in the gas-collecting device is at a lower pressure than the main body of emulsion and entrained gas flowing through the pipe 16. So also the valve 26 can be used to control the pressure in the gas-collecting device. However, it is not in all events necessary to use the gas-collecting device 21 for the gas can sometimes be re-cycled directly from the valve 19 into the incoming emulsion.

A branch 30 of the pipe 16 communicates with the dehydrator 3 to supply the emulsion and its entrained gas thereto and provides a valve 31 therein. This dehydrator includes a tank 32 in which a live electrode 33 is sustained by means of insulators 34. The particular type of electric dehydrator is not a part of the present invention. I have shown the pipe 30 as communicating with a perforated distributor pipe 35, the upper end of which is in the form of an electrode 36 which extends inside the live electrode 33. An electric field is established between the live and grounded electrodes 33 and 36 by means of a transformer or other current-supply device 38. As shown, this transformer includes a secondary winding 39 one terminal of which is connected by a conductor 40 to the tank 32, the other terminal of the secondary winding being connected by a conductor 41 to the live electrode 33. The conductor 41 passes through an insulator 43 carried by the top of the tank 32.

The operation of the device just described is as follows:

The emulsion to be dehydrated is pumped under high pressure through the pipe 8. Gas is also supplied at high pressure through the pipe 12, the relative amounts of gas and emulsion being controlled by the valves 9 and 13. The emulsion and the gas are severely agitated in passing through the filter material 7 and are brought into intimate contact with each other, sufficient pressure being maintained in the absorption device 1 to entrain the gas in the emulsion. The emulsion and the entrained gas then pass through the pipe 16. If a portion of the gas introduced into the absorption device has not been entirely absorbed or adsorbed by the emulsion, it will pass into and be removed by the gas-release means 2 including the trap 17 and the gas-collecting device 22, whence it may be re-cycled to the pump supplying gas to the pipe 12. It is not advisable to pass an excess of free gas into the dehydrator since it would interfere with the particular operation thereof. The trap 17 does not, however, materially reduce the pressure in the pipe 16, but merely acts to draw off excess gas. In some installations this gas release may be entirely dispensed with, the emulsion and the entrained gas being moved directly into the dehydrator.

The emulsion passes into the pipe 35 and is thereby introduced into the treating space between the electrodes 33 and 36. An electric field has at this time been established therein and the emulsion particles are coalesced into masses of sufficient size to gravitate from the oil. This separation takes place in the tank 32 in the form of the invention shown in Fig. 1. In this connection the water is withdrawn from the bottom of the tank 32 by means of a pipe 45 having a pressure-reducing and control valve 46. Dry oil is withdrawn from the upper part of the tank 32 through a pipe 48 having a pressure-reducing and control valve 49. The valves 46 and 49 are thus utilized in maintaining the pressure in the dehydrator 3. It is usually preferable to maintain this pressure approximately the same as the pressure in the absorption device, though the relative pressures can be controlled by proper manipulation of the valves 31, 46, and 49.

The gas may be withdrawn from the dehydrator with the oil and water and may be separated therefrom by conventional means. Thus, the pipe 48 may communicate with a gas-separating device 60 which separates gas from the oil, while a gas-separating device 61 may be provided in the pipe 45 for separating the gas and the water. The entrained gas is easily separated, it being usually necessary only to reduce the pressure thereon, and gas-separating devices such as the trap 17 and gas-collecting device 21 may be used in this capacity. Gas thus separated may conveniently be re-cycled through pipes 62 and 63 to the intake pipe 15 of the pump 14 through a pipe 64 including a valve 65. In this way a single charge of gas can be repeatedly re-cycled, additional amounts of gas being introduced through the pipe 15 from time to time to renew any gas which is lost in the system.

It is also possible to utilize other types of dehydrators in which separation takes place in a separate tank. In that event the separation can be effected either before or after the entrained gas is removed, though it is usually preferable to separate at the higher pressure, the gas being subsequently removed from the phases.

A viscous and oxidized emulsion can be readily treated by this method, though if this emulsion were introduced directly into the dehydrator 3, substantially no treatment would take place in the electric field. As previously pointed out, the absorption device causes the emulsion to become associated with the gas. A portion of this gas enters and is adsorbed at the interface between the water particles and the oil phase, but the largest proportion of the gas directly enters and is absorbed in the oil phase of the emulsion. The particular reasons why this preliminary treatment makes the emulsion amenable to electric treatment where otherwise such treatment could not be effected are not entirely understood. Several factors are, however, known. Thus, the absorbing and adsorbing of the gas by the oil materially reduces its viscosity, and quite markedly increases the resistivity, and at the same time decreases the surface and interfacial tensions. All of these factors tend, to some extent, to assist the electric treatment.

With regard to the pressure utilized, this will depend upon numerous factors including the type of emulsion undergoing treatment and the type of gas utilized. Pressures as low as 75 lbs. per square inch may sometimes be utilized, but usually the pressures should be 150 lbs. per square inch or more. As illustrative, and not for the purpose of limitation, it might be stated that at a pressure of 150 lbs. per square inch approximately thirty cubic feet of dry natural gas will be absorbed and adsorbed by a barrel if viscous emulsion. Such an amount of dry gas entrained in a body of emulsion will lower the viscosity approximately 14% or more, will increase the resistivity approximately 20%, and will materially reduce the interfacial tension of the emulsion. If a pressure of 500 lbs. per square inch is utilized approximately 100 cubic feet of natural gas will be entrained, while higher pressures will permit even greater amounts of the gas to become associated with the emulsion.

As pointed out above, however, I am not limited to the use of natural gas in this capacity. Thus, if carbon dioxide is utilized, approximately 80 cubic feet of the gas will be entrained in a barrel of emulsion at a pressure of 150 lbs. per square inch. If air is utilized, aproximately 8 cubic feet of gas per barrel will be entrained at 150 lbs. per square inch with correspondingly higher volumes at higher pressures.

I claim as my invention:

1. A method of dehydrating a viscous and oxidized emulsion, which comprises: simultaneously forcing said emulsion and a gas through a filter material under pressure to alter the surface tension of said emulsion; and subjecting said emulsion to the action of a high potential electric field.

2. A method of dehydrating a viscous and oxidized emulsion, which comprises: mixing said emulsion with a gas under pressure so that said emulsion will absorb at least a portion of said gas to modify the interfacial tension thereof; removing any unabsorbed gas from said emulsion; and subjecting said emulsion with its absorbed gas to the action of a high potential electric field while under sufficient pressure to maintain the gas entrained therein.

3. A method of electrically dehydrating a petroleum emulsion, which method includes the steps of: mixing said emulsion with a gas under pressure so that said emulsion absorbs and adsorbs at least a portion of said gas; removing any un-entrained gas from said emulsion; introducing the remaining emulsion into an electric field while under sufficient pressure to retain said gas in said emulsion; separating the phases of said emulsion; removing the gas from said phases; and re-cycling said gas removed from said phases and said un-entrained gas into the incoming emulsion.

4. In an apparatus for dehydrating a viscous oxidized emulsion, the combination of: a device containing a filter medium; means for simultaneously supplying said emulsion and a gas under pressure to said device; a dehydrator; means for conducting said emulsion into an electric field maintained in said dehydrator, said field agglomerating the phases of said emulsion; and means for withdrawing said phases from said dehydrator.

5. A combination as defined in claim 4 including a gas release between said device and said dehydrator to remove any of said gas not absorbed by said emulsion.

6. A method of electrically dehydrating a petroleum emulsion, which method includes the steps of: bringing said emulsion and a substantially non-condensable gas into intimate contact at a pressure of 75 lbs. per square inch or more whereby said gas is entrained in said emulsion; removing any un-entrained gas from said emulsion without substantially decreasing the pressure thereof; subjecting said emulsion and its entrained gas to the action of an electric field under sufficient pressure to retain said gas in said emulsion; and subsequently separating the phases of said emulsion and said gas.

7. A method of electrically dehydrating a petroleum emulsion, which method includes the steps of: bringing said emulsion and a substantially non-condensable gas into intimate contact at a pressure of 75 lbs. per square inch or more whereby said gas is entrained in said emulsion; removing any un-entrained gas from said emulsion without substantially decreasing the pressure thereof; subjecting said emulsion and its entrained gas to the action of an electric field under sufficient pressure to retain said gas in said emulsion; separating the phases of said emulsion while under substantially the same pressure as present during electric treatment; separately withdrawing said phases; and removing the gas from said phases.

8. A method of electrically dehydrating an emulsion, which method includes the steps of: absorbing under pressure in said emulsion a gas which is substantially non-condensable at atmospheric temperatures and pressure; passing the emulsion containing said absorbed gas into a space in which sufficient pressure is maintained to prevent the release of said gas; subjecting the emulsion while under this pressure and while in this space to the action of an electric field in such a manner as to cause the water content of the emulsion to separate from the oil content thereof; and withdrawing said water and said oil from said space separately so that they are prevented from re-emulsifying.

9. A method of electrically dehydrating an emulsion, which method includes the steps of: bringing a substantially non-condensable gas into the presence of said emulsion; subjecting said emulsion and gas to a pressure sufficient to absorb and adsorb said gas into said emulsion; subjecting said emulsion and the entrained gas to the action of an electric field while under sufficient pressure to retain said gas in said emulsion; separating the phases of said emulsion in a separating zone held under sufficient pressure to retain said gas entrained therein whereby said liquid in said phases separate into two bodies of liquid in said separating zone; separately withdrawing said liquids from said separating zone; and separating said gas and said liquids thus separately withdrawn by reducing the pressure thereon, thus preventing any re-emulsifying of said liquids when said pressure is reduced to liberate said gas.

10. A method of electrically dehydrating an emulsion, which method includes the steps of: subjecting said emulsion and a natural gas containing methane and ethane to sufficient pressure to entrain said natural gas in said emulsion; subjecting said emulsion and its entrained natural gas to the action of an electric field while under sufficient pressure to retain said natural gas in said emulsion; separating the phases of said emulsion in a separating zone under sufficient pressure to retain said gas in entrained condition, thus forming bodies of phase-liquids in said separating zone; and separately removing said phase-liquids from said separating zone before the entrained gas is liberated therefrom, thus preventing re-emulsification of said phase-liquids when said gas is liberated.

11. A method of electrically dehydrating a viscous and oxidized emulsion, which method includes the steps of: mixing with said emulsion a gaseous mixture a large percentage of which is non-condensable, said mixing taking place under pressure sufficiently high to cause said emulsion to absorb and adsorb said gaseous mixture; subjecting said emulsion and its entrained gaseous mixture to the action of an electric field while under sufficient pressure to retain said gaseous mixture in said emulsion whereby the dispersed particles of said emulsion coalesce into larger masses; gravitationally separating the phases of said emulsion in a separating zone under sufficient pressure to retain said gas in entrained condition, thus forming bodies of phase-liquids in said separating zone; separately removing said phase-liquids from said separating zone; and reducing the pressure on said phase-liquids thus separately withdrawn to release said gas whereby said gas is released from said phase-liquids only after they have been separately withdrawn, thus preventing re-emulsification of said phase-liquids when said gas is liberated.

HAROLD C. EDDY.